June 13, 1939.  W. S. PRAEG  2,161,901
BROACH
Filed April 26, 1937   2 Sheets-Sheet 1

*INVENTOR*
WALTER S. PRAEG.
BY Whittemore Hulbert & Belknap
*ATTORNEYS*

June 13, 1939.　　　W. S. PRAEG　　　2,161,901
BROACH
Filed April 26, 1937　　2 Sheets-Sheet 2

*INVENTOR*
WALTER. S. PRAEG.
BY Whittemore Hulbert & Belknap
*ATTORNEYS*

Patented June 13, 1939

2,161,901

UNITED STATES PATENT OFFICE 2,161,901

BROACH

Walter S. Praeg, Detroit, Mich., assignor to National Broach & Machine Company, Detroit, Mich., a corporation of Michigan Application April 26, 1937, Serial No. 139,082

15 Claims. (Cl. 29—95.1)

This invention relates to broaches and more specifically to a broach designed to cut spiral grooves.

It is an object of the invention to form a broach in such form that it will establish and maintain a spiral guiding action with the work to be cut.

It is a further object of the invention to provide a broach having successive teeth arranged in a spiral path and a second series of uninterrupted annular teeth, said two series of teeth being spaced apart by a dwell of such length that one series of cutting teeth will be out of engagement with the work before the other series comes into engagement with the work.

It is still further an object of the invention to provide a broach having a succession of teeth arranged in a spiral path so as to establish and maintain spiral guiding action between the tool and work in which the pitch of the first few entering teeth is materially reduced, whereby the guiding action will be established upon a correspondingly reduced relative movement between the broach and the work.

Further objects will be made apparent as this description proceeds, and especially when taken in connection with the accompanying drawings, in which Fig. 1 is a side elevation of a broach embodying my invention;

Fig. 2 is a cross section thereof taken on the lines 2—2 of Fig. 1;

Figs. 3 to 8 inclusive are diagrams indicating successive cuts taken by succeeding teeth on a greatly exaggerated scale;

In cutting spiral grooves by broaching, it has been common practice in the past to provide an external guiding means for rotating the broach relative to the work or vice versa. I have found that it is unnecessary to provide such external guiding means if the broach is formed as indicated herein.

Figure 1:
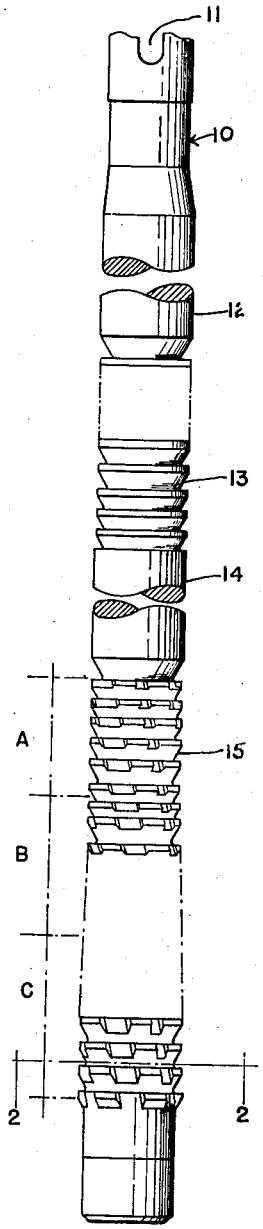
Figure 2:
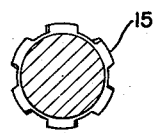

A broach generally indicated by the numeral 10 is shown in Fig. 1 as having an aperture 11 to which may be secured suitable means for drawing the broach through the work. Immediately following this apertured portion is a cylindrical pilot 12 for centering the broach in the work piece. Following this is a portion 13 having a succession of uninterrupted cylindrical teeth which are adapted to finish to a correct size the interior surface being broached. Next succeeding the cylindrical teeth is a dwell 14 of such length that the cylindrical teeth 13 will be out of cutting engagement with the work before the next succeeding teeth 15 come into engagement with the work. The balance of the broach is made up of a succession of teeth 15 arranged in a spiral row from end to end. As is indicated by the letters A, B and C, this spiral portion of the broach is divided into three corresponding zones. It will be understood that this showing is not intended to limit the number of teeth in any particular zone, and in the diagrams of Figs. 3 to 8 inclusive the preferred number of teeth in each particular zone will be pointed out.

The general arrangement of the teeth 15 is the same as in broaches heretofore constructed in that there are a plurality of spiral rows of teeth corresponding to the number of spiral grooves which are to be cut in the article. Also the teeth in general increase in height from the front end of the broach to the rear end. In the forms of the invention diagrammatically illustrated in Figs. 3 to 8, the first several teeth in each of the spiral rows have a cutting width narrower than the thickness of the final tooth slot at the root diameter. Thus as the first few teeth of the broach enter the work, they cut a narrow spiral slot in the work and at this time there is a certain tendency for the broach to drift toward the straight line pull. After the first few teeth have entered the work, it has been found that the broach will turn at the correct spiral and will hold the lead very accurately. It has been definitely established that when three teeth are in engagement with the work, the spiral angle is accurately determined.

In the Figs. 3 to 8 it will be understood that the various numbered lines indicate cuts taken by succeeding teeth. These figures may be regarded as fragmentary sectional views of the work, and the lines will indicate the path taken by succeeding teeth. Thus it will be apparent that, for example, in Fig. 3, the first tooth of the spiral series A removes metal to form a shallow groove somewhat narrower than the ultimate width of groove, as shown by the line numbered 1. The next tooth takes a cut 2 of the same width but to a greater depth. For simplicity the letters A, B and C are applied in Figs. 3 to 8 to indicate the cuts taken by like identified portions of the broach. Numerals 1, 2, 3, etc., identify cuts taken by separate teeth of the zones. Thus in Fig. 4 the letter A indicates the groove made by teeth of zone A of the broach, and numerals 1 to 5 applied to the same cut trace indicate that the first five teeth (constituting zone A) are identical. With this explanation, it is believed Figs. 3 to 8 are best adapted to give a full understanding of the construction of my improved broaches.

Figure 3:
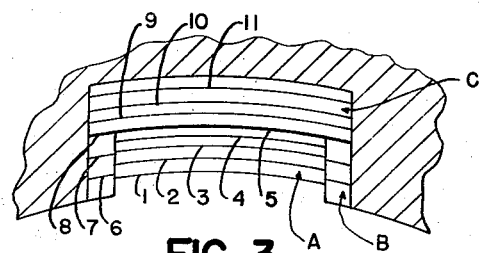

I have illustrated in Fig. 3 a modification in which the first zone A has a succession of teeth, herein shown as five in number. These teeth are of the same width and of gradually increasing height. The width of these teeth is less than the width of the finished groove and the teeth are spaced relatively close together. In this modification, the next succession of teeth, corresponding to the zone B shown in Fig. 1, is made up of a lesser number of teeth, herein shown as three, of the same width as the finished groove, and of more rapidly increasing height. The relationship between the difference in height of succeeding teeth in zones A and B is such that the three teeth in zone B cut to the same depth as the five teeth in zone A, or in other words, the eighth tooth is the same height as the fifth tooth. Zone C in this modification is made up of teeth of full groove width of gradually increasing height and of substantially greater pitch than the teeth of the first two zones. The pitch of the teeth in zone C is standard for the particular size broach. By way of illustration, a broach may be made acording to the teachings of Fig. 3 having the following dimensions. Teeth of zone A are adapted to each take a cut of .002 inch and are .375 inch wide. The groove being cut is .395 inch wide, so that the teeth of group A leave .010 inch of material on each side to be removed by the teeth of group B. The teeth of group B are of the full groove width, that is .395 inch, and are adapted to take a cut on the order of .003 inch. The teeth of group A are of $\frac{1}{8}$ inch pitch, the teeth of group B are of ¼ inch pitch, and the teeth of group C are standard or ⅜ inch pitch. In this form the first five teeth to engage the work establish and maintain a spiral guiding action which is sufficient to insure the proper relative rotation between the work and the broach. The succeeding teeth in group B enlarge the groove to the desired final width to the depth of the cut made by the teeth in group A. At this time a groove of the desired width and of a depth sufficient to insure spiral guiding action has been formed. The succeeding teeth, which will be many more in number than in groups A and B, and in this particular broach are 40 in number, will finish the groove to the desired final depth.

Figure 4:
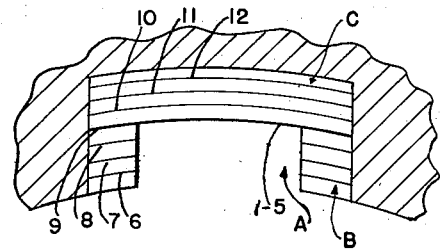

A modification is illustrated in Fig. 4 in which the teeth of group A, which in this instance may be five in number, are of uniform height and uniform width. These teeth establish the spiral guiding action. They are succeeded by the teeth of group B, herein shown as four in number, which in this instance are of the final width of groove and increase in height. When the teeth of group B have passed any given point, a groove of final width has been formed which will continue to guide the succeeding teeth to the correct spiral angle while the succeeding teeth finish to final depth.

For purposes of illustrating the relative dimensions of parts, the dimensions are given for a specific broach of this type. The groove to be cut is .395 inch wide. The first five teeth comprising the group A are each of the same height, and the first will take a cut of .013 inch. The following four teeth establish the spiral guiding action. These teeth are .187 inch wide, which will leave .054 inch of metal at the sides of the groove to be removed by the teeth of group B. The teeth of group A have a pitch of $\frac{1}{8}$ inch; the teeth of group B have a pitch of ¼ inch, and the succeeding teeth, which are of full groove width and are adapted to finish the groove the full depth, have a standard pitch of ⅜ inch.

Figure 5:
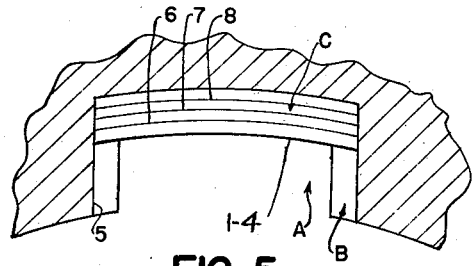

Another modification as illustrated in Fig. 5 contemplates the teeth of group A being of uniform height and width, and they are herein shown as four in number. The width of these teeth is to be very slightly less than the desired width of groove, so that a single tooth may cut the groove to final width. In other words, in this modification the group B is composed of a single tooth of final groove width and of the same height as the teeth in group A. As in the foregoing modifications, the teeth or group C finish the groove to final width and final depth. As an example, a specific broach may be made according to the teachings of this modification in which the teeth of the first group are four in number and have a pitch of $\frac{1}{8}$ inch. The width of these teeth is .062 inch less than the final desired width of groove. The fifth tooth is therefore .062 inch wider than the teeth of group A and finishes the group to a desired width. The balance of the teeth comprising group C are $\frac{3}{8}$ inch pitch, which is standard for this particular size of broach.

Figure 6:
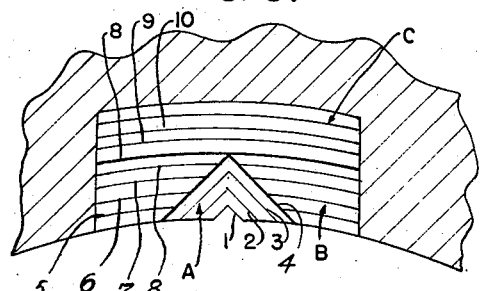

Another modification is illustrated in Fig. 6 in which the teeth of group A are inverted V-shaped of gradually increasing height and width. In this modification these teeth are followed by group B comprising a series of teeth of full groove width and increasing in height at a rate such that four or five teeth will cut the groove to the same depth as the last tooth in group A. Again in this modification the succeeding teeth comprising group C finish the groove to the desired depth and width.

Figure 7:
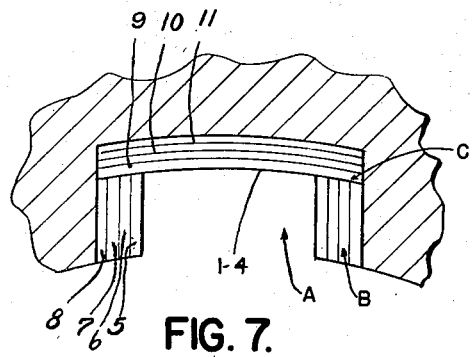

A fifth modification is illustrated in Fig. 7 in which the first few teeth, herein shown as four in number, are of uniform height and width comprising group A. Group B is composed of a series of teeth (as illustrated, four in number), of the same height as the teeth in group A but of gradually increasing width, so that the last tooth in this group cuts the groove to final width. As in the other modifications above described, the succeeding group of teeth comprising the group C are of full groove width and increase gradually in height to finish the groove to the desired depth.

Figure 8:
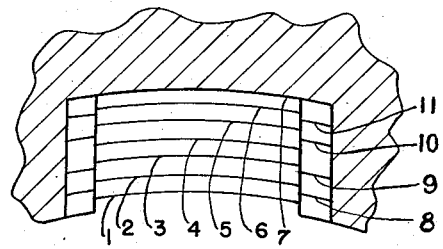

Fig. 8 illustrates a sixth modification in which the teeth are divided into only two groups, the first group being of a width somewhat less than the desired final width of groove and increasing in height until the height equals the desired depth of groove. As will be obvious, these teeth will cut a groove of the desired depth and at the desired spiral angle but somewhat narrower than the desired finished groove. This group of teeth is followed by a group of teeth of width equal to the desired finished width of groove, and of gradually increasing height up to a height equal to the desired depth of groove.

It should be understood that in the preceding description and diagrammatic illustrations the exact number of cutting teeth is not essential to the carrying out of the invention, and I have attempted only to give the general idea of the various methods whereby the true spiral angle may be obtained. Thus in the modification illustrated in Figs. 3 to 8, the number of teeth in the first group may range from four to ten, it being only necessary to have a sufficient number to maintain the correct spiral angle. The width of the teeth will vary according to the work to be broached. It should also be understood that the broaching action according to this invention may be obtained whether the splined slots are to be of rectangular cross section are of involute cross section or any other suitable cross section.

Figures 9, 10:
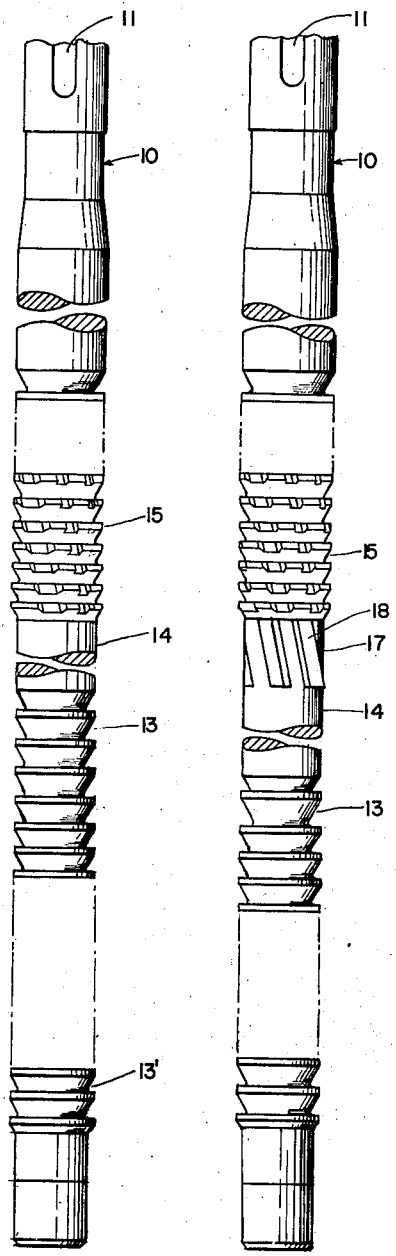
Fig. 9 is an elevation of a modification of my improved broach.
Fig. 10 is an elevation of another modified form of broach.

In Fig. 9 is illustrated a broach embodying a further feature of my invention. In this figure is illustrated a broach generally indicated by the numeral 10 having an apertured end 11 for attachment to suitable means for drawing the broach through the work. Following this is a section of teeth 15 arranged in a spiral row from end to end, which may be formed according to the teachings of any of the above described modifications. Following these spiral teeth is a cylindrical dwell 14 of such length that the teeth 15 are out of cutting engagement with the work before the next succeeding series of teeth 13 comes into engagement with the work. The teeth indicated at 13 are of uninterrupted annular form and are adapted to finish the inside bore of the work piece. The last three of the teeth 13' are of the same diameter so that after the first tooth wears away, a succeeding tooth will take up the cutting action and finish the bore to the desired size.

In the modification shown in Fig. 10, the broach 10 has an aperture 11 for connection with a suitable mechanism for pulling the broach through the work. The broach is provided with spiral cutting teeth 15 as in the above described modifications. These teeth are adapted to establish and maintain spiral guiding action between the broach and the work at the same time as they cut the desired spiral groove. In this modification, the following series of teeth 13 is provided to finish the inside of the bore to desired dimensions. Interposed between the spiral teeth 15 and the annular teeth 13 is a pilot portion 17 followed by a cylindrical dwell 14. The pilot portion 17 is generally cylindrical in shape and of a diameter such that it fits closely within the bore of the part containing the spiral groove. Superimposed on this cylindrical portion are spiral guiding elements 18. These elements have the same spiral angle as the cutting teeth 15 but are not in themselves cutting elements. Their function is to guide the broach in the desired spiral angle in the work while the last few cutting teeth complete the groove being broached. Following this portion 17 is the dwell 14 which is of such length that the guiding elements 18 will be out of engagement with the spiral grooves before the annular cutting teeth 13 come into engagement with the work. The purpose of this arrangement is to insure that the spiral cutting teeth up to and including the last tooth are properly guided in the desired spiral path and to insure that relative rotation of the work and broach has ceased before the first annular cutting tooth comes into engagement with the work.

While I have illustrated and described various preferred embodiments of my invention, it will be apparent to those skilled in the art that various additions, omissions, substitutions and modifications may be made within the scope of my invention, as indicated by the appended claims.

What I claim as my invention is:

1. A broach for cutting a spiral spline adapted to establish and maintain spiral guiding action solely by the engagement of said broach with the work piece, said broach having consecutive series of teeth arranged in a spiral row from end to end, the first series of said teeth having a substantially reduced pitch, whereby a plurality of teeth will come into engagement with the work and establish accurate spiral guiding action upon a correspondingly reduced length of travel of said broach relative to said work piece, said first series of teeth being of a width less than the final width of the spline, the next series of teeth being of full spline width, and increasing in height to the height of said last tooth of said first series.

2. A broach for cutting a spiral spline adapted to establish and maintain spiral guiding action solely by the engagement of said broach with the work piece, said broach having consecutive series of teeth arranged in a spiral row from end to end, the first series of said teeth having a substantially reduced pitch, whereby a plurality of teeth will come into engagement with the work and establish accurate spiral guiding action upon a correspondingly reduced length of travel of said broach relative to said work piece, said first series of teeth being of a width less than the final width of the spline, the next series of teeth being of full spline width and increasing in height to the height of said last tooth of the said first series, and the final series of teeth being of full spline width and increasing in height to the desired spline depth.

3. A broach for cutting a spiral spline adapted to establish and maintain spiral guiding action solely by the engagement of said broach with the work piece, said broach having consecutive series of teeth arranged in a spiral row from end to end, the first series of said teeth having a substantially reduced pitch, whereby a plurality of teeth will come into engagement with the work and establish accurate spiral guiding action upon a correspondingly reduced length of travel of said broach relative to said work piece, said first series of teeth being of a width less than the final width of the spline, the next series of teeth being of full spline width and increasing in height to the height of said last tooth of the said first series, and the final series of teeth being of full spline width and increasing in height to the desired spline depth, said final series being of substantially greater pitch than said first series.

4. A broach for cutting a spiral spline adapted to establish and maintain spiral guiding action solely by the engagement of said broach with the work piece, said broach having teeth arranged in a spiral row from end to end, the first few of said teeth having a substantially reduced pitch, whereby a plurality of teeth will come into engagement with the work and establish accurate spiral guiding action upon a correspondingly reduced length of travel of said broach, said first few teeth being of a width less than the final width of the spline and of gradually increasing height.

5. A broach for cutting a spiral spline adapted to establish and maintain spiral guiding action solely by the engagement of said broach with the work piece, said broach having consecutive series of teeth arranged in a spiral row from end to end, the first series of said teeth having a substantially reduced pitch, whereby a plurality of teeth will come into engagement with the work and establish accurate spiral guiding action upon a correspondingly reduced length of travel of said broach, said first series of teeth being of a width less than the final width of the spline and of gradually increasing height, the next series of teeth being of full spline width, and increasing in height to the height of said last tooth of said first series.

6. A broach for cutting a spiral spline adapted to establish and maintain spiral guiding action solely by the engagement of said broach with the work piece, said broach having consecutive series of teeth arranged in a spiral row from end to end, the first series of said teeth having a substantially reduced pitch, whereby a plurality of teeth will come into engagement with the work and establish accurate spiral guiding action upon a correspondingly reduced length of travel of said broach, said first series of teeth being of a width less than the final width of the spline and of gradually increasing height, the next series of teeth being of full spline width, and increasing in height to the height of said last tooth of said first series, and the final series of teeth being of full spline width and increasing in height to the desired spline depth.

7. A broach for cutting a spiral spline adapted to establish and maintain spiral guiding action solely by the engagement of said broach with the work piece, said broach having consecutive series of teeth arranged in a spiral row from end to end, the first series of said teeth having a substantially reduced pitch, whereby a plurality of teeth will come into engagement with the work and establish accurate spiral guiding action upon a correspondingly reduced length of travel of said broach, said first series of teeth being of a width less than the final width of the spline and of gradually increasing height, the next series of teeth being of full spline width, and increasing in height to the height of said last tooth of said first series, and the final series of teeth being of full spline width and increasing in height to the desired spline depth, said final series being of substantially greater pitch than said first series.

8. A broach for cutting a spiral spline adapted to establish and maintain spiral guiding action solely by the engagement of said broach with the work piece, said broach having teeth arranged in a spiral row from end to end, the first few of said teeth having a substantially reduced pitch, whereby a plurality of teeth will come into engagement with the work and establish accurate spiral guiding action upon a correspondingly reduced length of travel of said broach, said first few teeth being of a width less than the final width of the spline and of uniform height.

9. A broach for cutting a spiral spline adapted to establish and maintain spiral guiding action solely by the engagement of said broach with the work piece, said broach having teeth arranged in a spiral row from end to end, the first few of said teeth being of a width less than the final width of the spline and of uniform height.

10. A broach for cutting a spiral spline adapted to establish and maintain spiral guiding action solely by the engagement of said broach with the work piece, said broach having consecutive series of teeth arranged in a spiral row from end to end, the first series of said teeth being of a uniform width less than the final spline width and of increasing height, and the next series of teeth being of full spline width and increasing in height more rapidly than said first series.

11. A broach for a cutting spiral spline adapted to establish and mainatin spiral guiding action solely by the engagement of said broach with the work piece, said broach having a series of uninterrupted annular teeth, and a series of spiral teeth for cutting the spline and establishing and maintaining spiral guiding action, said two series of teeth being separated by a cylindrical dwell of such longitudinal dimensions that one of said series of teeth will be out of cutting engagement with the work before the other series of teeth comes into cutting engagement with the work.

12. A broach having a series of spiral cutting teeth adapted to establish and maintain spiral guiding action between the broach and the work while cutting a spiral groove therein, a pilot following said spiral cutting teeth having a non-cutting spiral guiding spline for engaging the groove previously cut by the cutting teeth, and guiding the broach in the desired spiral until the cutting teeth have passed out of engagement with the work.

13. A broach having a series of spiral cutting teeth adapted to establish and maintain spiral guiding action between the broach and the work while cutting a spiral groove therein, a pilot following said spiral cutting teeth having a non-cutting spiral guiding spline for engaging the groove previously cut by the cutting teeth, and guiding the broach in the desired spiral until the cutting teeth have passed out of engagement with the work, a cylindrical dwell following said pilot, annular finishing teeth following said dwell, said dwell being of a length such that relative rotation of the broach and work ceases before the annular teeth come into engagement with the work.

14. A broach having a series of spiral cutting teeth adapted to establish and maintain spiral guiding action between the broach and the work while cutting a spiral groove therein, the first few of said spiral cutting teeth being of a width less than the final spline width, a pilot following said spiral cutting teeth having a non-cutting spiral guiding spline for engaging the groove previously cut by the cutting teeth, and guiding the broach in the desired spiral until the cutting teeth have passed out of engagement with the work, a cylindrical dwell following said pilot, annular finishing teeth following said dwell, said dwell being of a length such that relative rotation of the broach and work ceases before the annular teeth come into engagement with the work, said annular teeth being adapted to finish the bore internally of the groove.

15. In a broach having a section provided with spiral teeth adapted to establish and maintain spiral guiding action solely by the engagement between the broach and work piece, the first few of said teeth having a substantially reduced pitch, whereby a plurality of said teeth will come into engagement with the work and establish accurate spiral guiding action upon a correspondingly reduced length of travel, said first few teeth being of a width slightly less than the final width of groove, subsequent teeth being of full groove width and increasing in height from tooth to tooth by an amount substantially greater than is possible in teeth of the same width operating to cut completely across their top edge.

WALTER S. PRAEG.